(12) United States Patent
Saruwatari

(10) Patent No.: US 7,545,580 B2
(45) Date of Patent: Jun. 9, 2009

(54) ZOOM LENS AND IMAGE PICKUP APPARATUS INCLUDING THE SAME

(75) Inventor: Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/022,804

(22) Filed: Jan. 30, 2008

(65) Prior Publication Data

US 2008/0180807 A1  Jul. 31, 2008

(30) Foreign Application Priority Data

Jan. 30, 2007  (JP) ............................. 2007-019133

(51) Int. Cl.
G02B 15/14 (2006.01)
G02B 27/64 (2006.01)
(52) U.S. Cl. .................. 359/687; 359/554; 359/557
(58) Field of Classification Search ................ 359/687, 359/554, 557, 686
See application file for complete search history.

(56) References Cited

U.S. PATENT DOCUMENTS

| 5,585,966 | A | 12/1996 | Suzuki |
| 6,016,228 | A | 1/2000 | Uzawa |
| 6,166,864 | A | 12/2000 | Horiuchi |
| 6,456,441 | B2 | 9/2002 | Hoshi |
| 6,462,886 | B1 | 10/2002 | Hagimori |
| 6,975,461 | B2 | 12/2005 | Eguchi |
| 7,057,818 | B2 * | 6/2006 | Hamano et al. ............. 359/557 |
| 7,206,137 | B2 | 4/2007 | Nakatani et al. |
| 2005/0007480 | A1 | 1/2005 | Hamano et al. |

FOREIGN PATENT DOCUMENTS

JP  2003-032504 A  1/2003

* cited by examiner

Primary Examiner—Scott J Sugarman
(74) Attorney, Agent, or Firm—Canon USA Inc IP Div

(57) ABSTRACT

A zoom lens includes, in order from an object side to an image side, a first lens unit having positive refractive power, a second lens unit having negative refractive power, a third lens unit having positive refractive power, and a fourth lens unit having positive refractive power. The zoom lens performs zooming by moving each of the lens units. The first lens unit and the third lens unit are positioned closer to the object at a telephoto end than at a wide-angle end. The zoom lens satisfies the following conditions:

$0.3 < |m1/m2| < 1.5$ $0.3 < |m3/m2| < 0.8$ where m1, m2, and m3 are the amounts of movement of the first lens unit, the second lens unit, and the third lens unit, respectively, along an optical axis during zooming from the wide-angle end to the telephoto end.

10 Claims, 13 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens. For example, the image pickup apparatus is suitable for use as a video camcorder, an electronic still camera, a silver-halide film camera, or the like.

2. Description of the Related Art

In recent years, image pickup apparatuses, such as video camcorders, digital still cameras, broadcasting cameras, and silver-halide film cameras, using a solid-state image pickup device have become more sophisticated and compact. Accordingly, it is demanded that a compact zoom lens with a short overall length and high resolving power be included as a photographing optical system in such image pickup apparatuses.

As a zoom lens having a compact optical system and a high zoom ratio, there is known a four-unit zoom lens including, in order from the object side to the image side, first, second, third, and fourth lens units having positive, negative, positive, and positive refractive powers, respectively. This four-unit zoom lens performs zooming by moving each lens unit.

Among four-unit zoom lenses of this type, there is known a so-called rear focusing zoom lens which performs focusing by moving the fourth lens unit (see, e.g., U.S. Pat. Nos. 6,462,886 and 6,166,864).

For compact storage and better portability of a camera (i.e., image pickup apparatus), it is effective to use a retractable zoom lens in which lens units retract when the camera is not in use (i.e., when the camera is in non-photographing mode). As a zoom lens that can meet such a need, there is known a zoom lens which is short in the overall length of each lens unit and suitable for use as a retractable zoom lens. This zoom lens includes, in order from the object side to the image side, first, second, third, and fourth lens units having positive, negative, positive, and positive refractive powers, respectively (see, e.g., U.S. Pat. Nos. 6,016,228, 6,456,441, 6,975,461, US Patent Application No. 2005/0007480, and U.S. Pat. No. 7,206,137).

At the same time, there is also a known zoom lens in which some of its lens units are displaced for correction of image blur. For example, in a four-unit zoom lens including, in order from the object side to the image side, first, second, third, and fourth lens units having positive, negative, positive, and positive refractive powers, respectively, the third lens unit is vibrated in a direction perpendicular to an optical axis so as to form a still image (see, e.g., U.S. Pat. No. 5,585,966).

Generally, a compact zoom lens can be realized by reducing the number of lens elements constituting the entire zoom lens while increasing the refractive power of each of lens units constituting the zoom lens. However, in a zoom lens constructed as described above, an increase in the refractive power of each lens surface means an increased lens thickness. This not only causes an insufficient reduction in the overall length of the lens system, but also makes it difficult for the zoom lens to correct aberrations and provide high optical performance.

Therefore, to realize a compact zoom lens with a high zoom ratio and high optical performance, it is necessary to appropriately define movement of each lens unit for zooming, refractive power of each lens unit, and lens configuration in each lens unit.

At the same time, due to the mechanical structure of a camera, retraction and storage of lens units while the camera is not in use cause an increase in error resulting from the tilt of lens elements and lens units. In this case, if the degree of sensitivity which may affect the optical performance of the lens elements and lens units is high, degradation in optical performance may result or image jitter may occur during zooming. Therefore, to achieve high optical performance, it is desirable to configure the zoom lens such that the sensitivity of the lens elements and lens units is minimized.

As described above, it is important for a zoom lens to achieve both compactness of the entire optical system and high optical performance.

SUMMARY OF THE INVENTION

By appropriately defining the amount of movement of each lens unit for zooming, the refractive power of each lens unit, and the like, the present invention provides a compact zoom lens that is capable of providing high optical performance throughout the entire zoom range, and also provides an image pickup apparatus including the zoom lens.

According to an aspect of the present invention, a zoom lens includes, in order from an object side to an image side, a first lens unit having positive refractive power, a second lens unit having negative refractive power, a third lens unit having positive refractive power, and a fourth lens unit having positive refractive power. The zoom lens performs zooming by moving each of the lens units. The first lens unit and the third lens unit are positioned closer to the object at a telephoto end than at a wide-angle end. The zoom lens satisfies the following conditions:

$$0.3 < |m1/m2| < 1.5$$

$$0.3 < |m3/m2| < 0.8$$

where m1, m2, and m3 are the amounts of movement of the first lens unit, the second lens unit, and the third lens unit, respectively, along an optical axis during zooming from the wide-angle end to the telephoto end.

Further features of the present invention will become apparent from the following description of exemplary embodiments with reference to the attached drawings.

DESCRIPTION OF THE EXEMPLARY EMBODIMENTS

Hereinafter, exemplary embodiments of a zoom lens and an image pickup apparatus including the zoom lens according to the present invention will be described.

The zoom lens of each exemplary embodiment includes, in order from an object side to an image side, a first lens unit having positive refractive power, a second lens unit having negative refractive power, a third lens unit having positive refractive power, and a fourth lens unit having positive refractive power.

The zoom lens performs zooming by moving each lens unit. During zooming, the first lens unit and the third lens unit are moved to be positioned closer to the object at the telephoto end than at the wide-angle end. During zooming from the wide-angle end to the telephoto end, the first lens unit moves along a locus convex toward the image side, while the fourth lens unit moves along a locus convex toward the object side.

Figure 1:
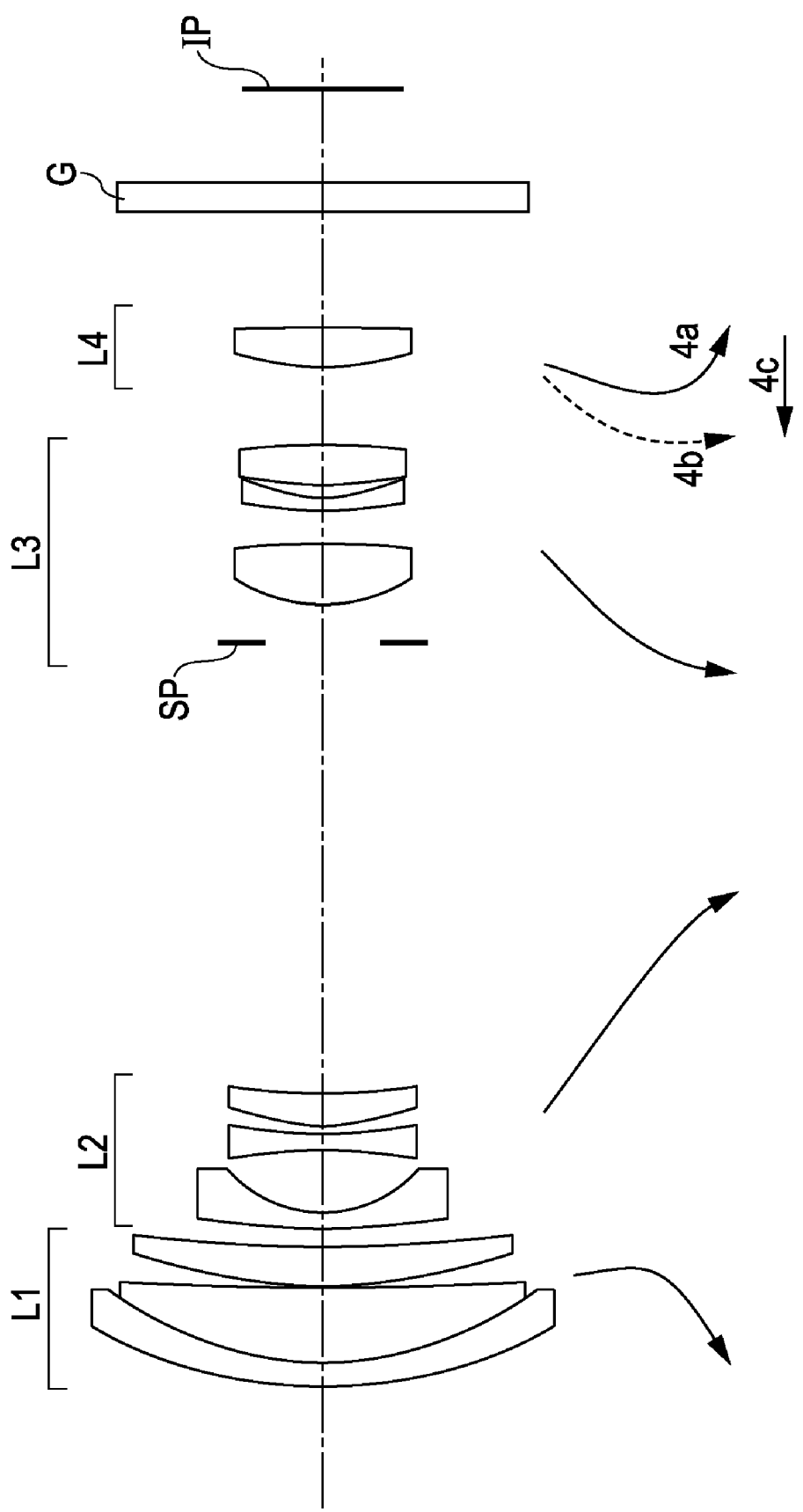
FIG. 1 illustrates a lens cross section at the wide-angle end of a zoom lens according to a first exemplary embodiment of the present invention.
Figure 2:
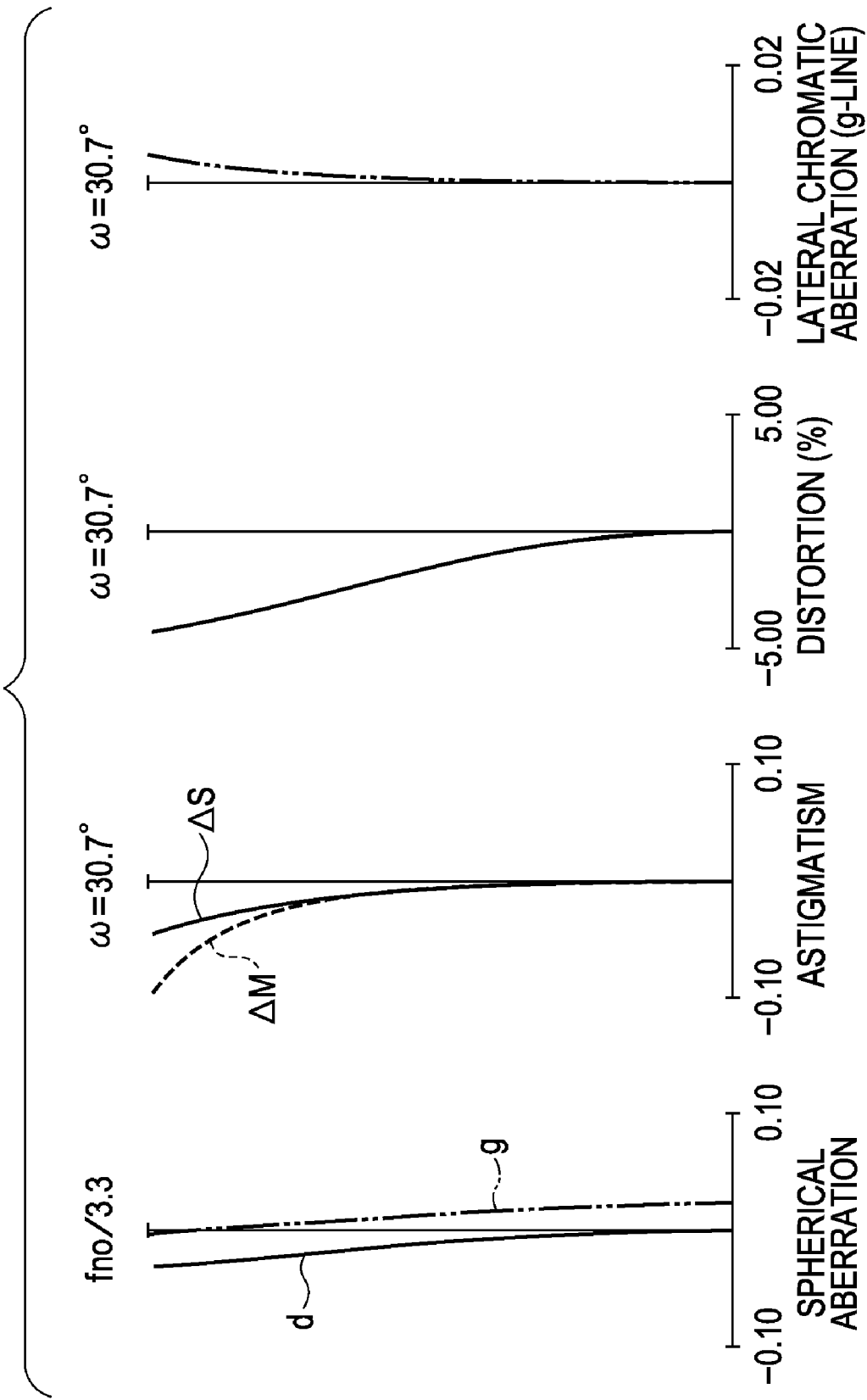
FIG. 2 is an aberration diagram at the wide-angle end of the zoom lens according to numerical example 1 corresponding to the first exemplary embodiment.
Figure 3:
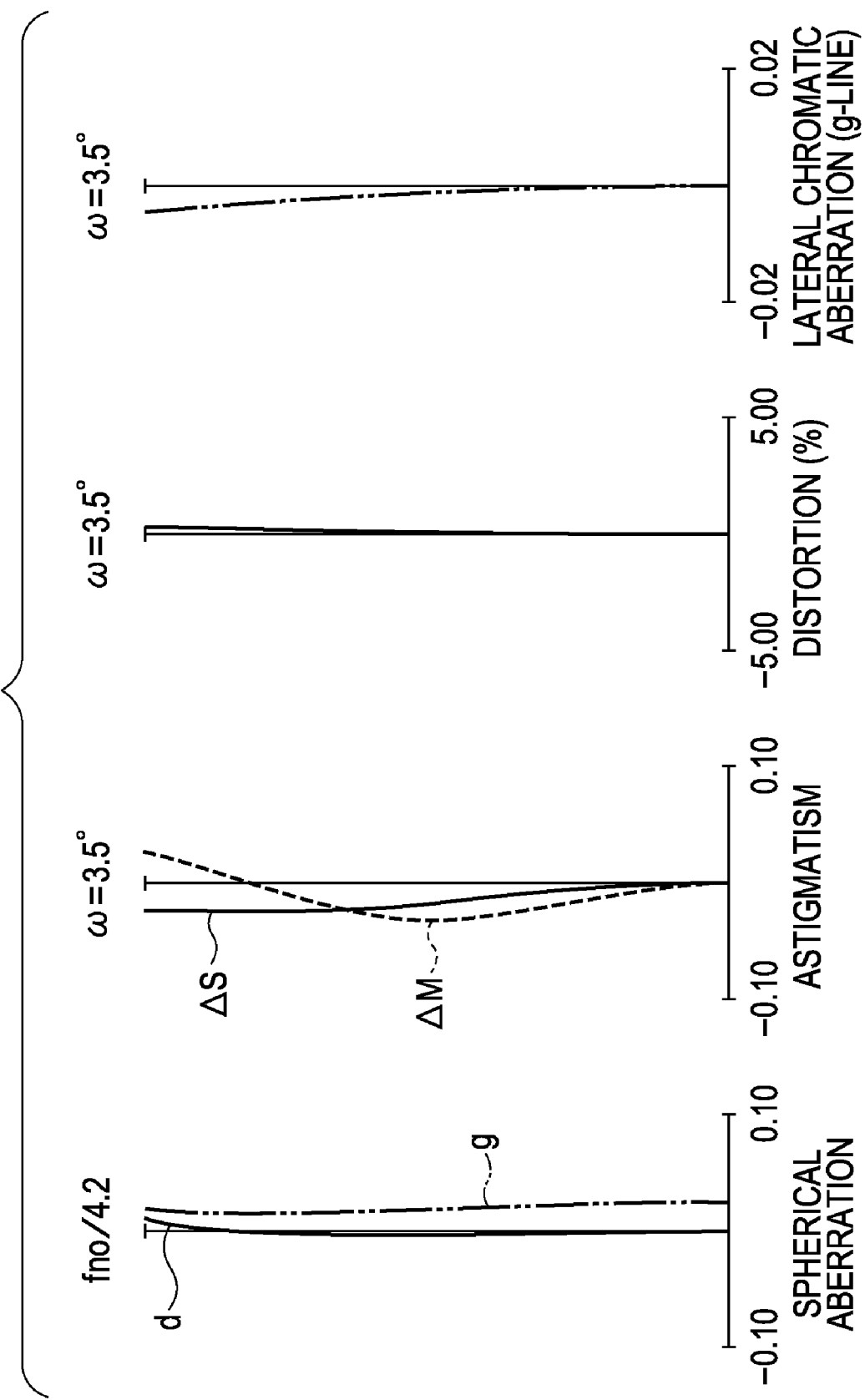
FIG. 3 is an aberration diagram at the telephoto end of the zoom lens according to numerical example 1 corresponding to the first exemplary embodiment.

FIG. 1 illustrates a lens cross section at the wide-angle end (short focal length end) of the zoom lens according to the first exemplary embodiment of the present invention. FIG. 2 and FIG. 3 are aberration diagrams at the wide-angle end and telephoto end (long focal length end), respectively, of the zoom lens according to the first exemplary embodiment.

Figure 4:
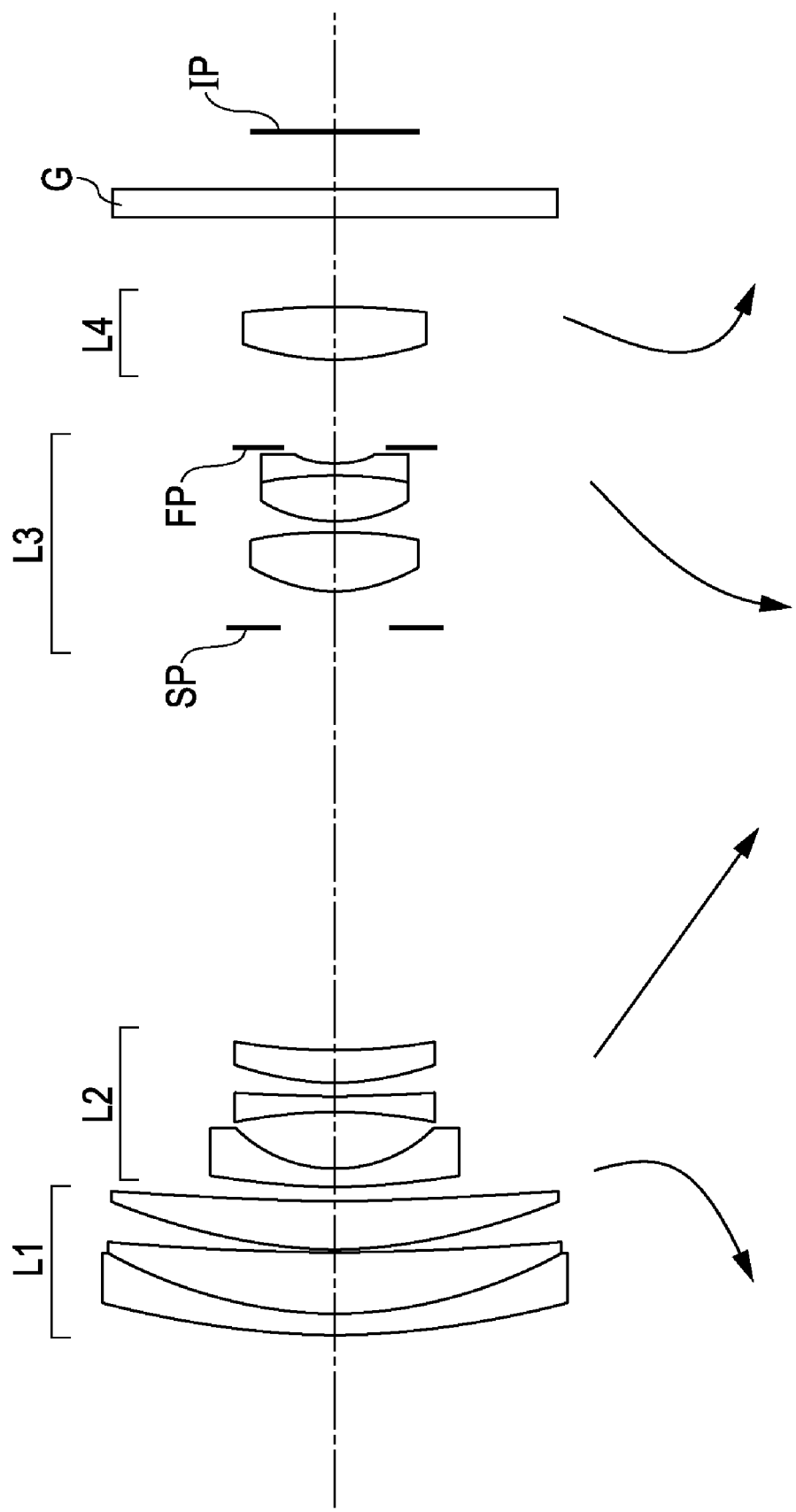
FIG. 4 illustrates a lens cross section at the wide-angle end of a zoom lens according to a second exemplary embodiment of the present invention.
Figure 5:
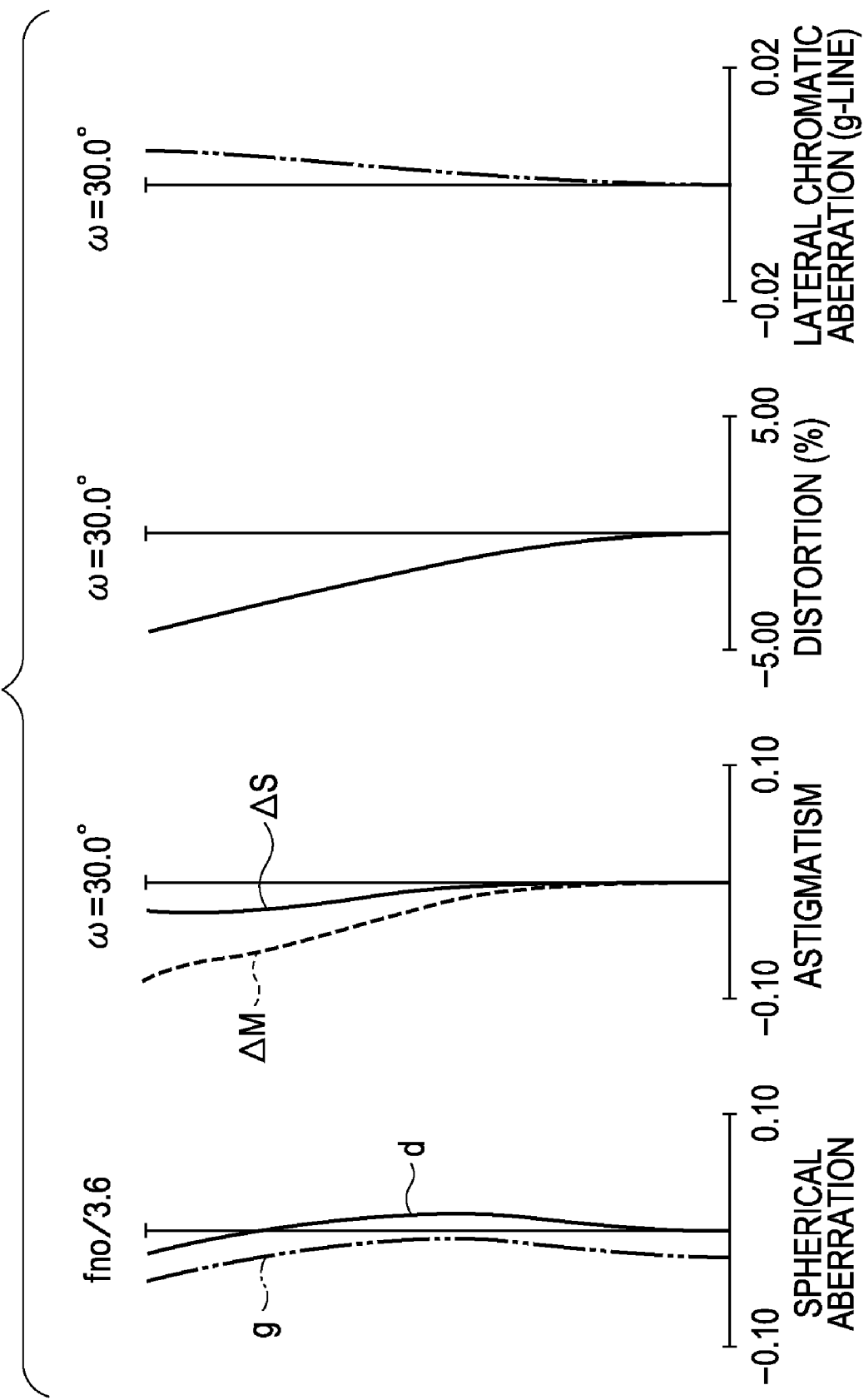
FIG. 5 is an aberration diagram at the wide-angle end of the zoom lens according to numerical example 2 corresponding to the second exemplary embodiment.
Figure 6:
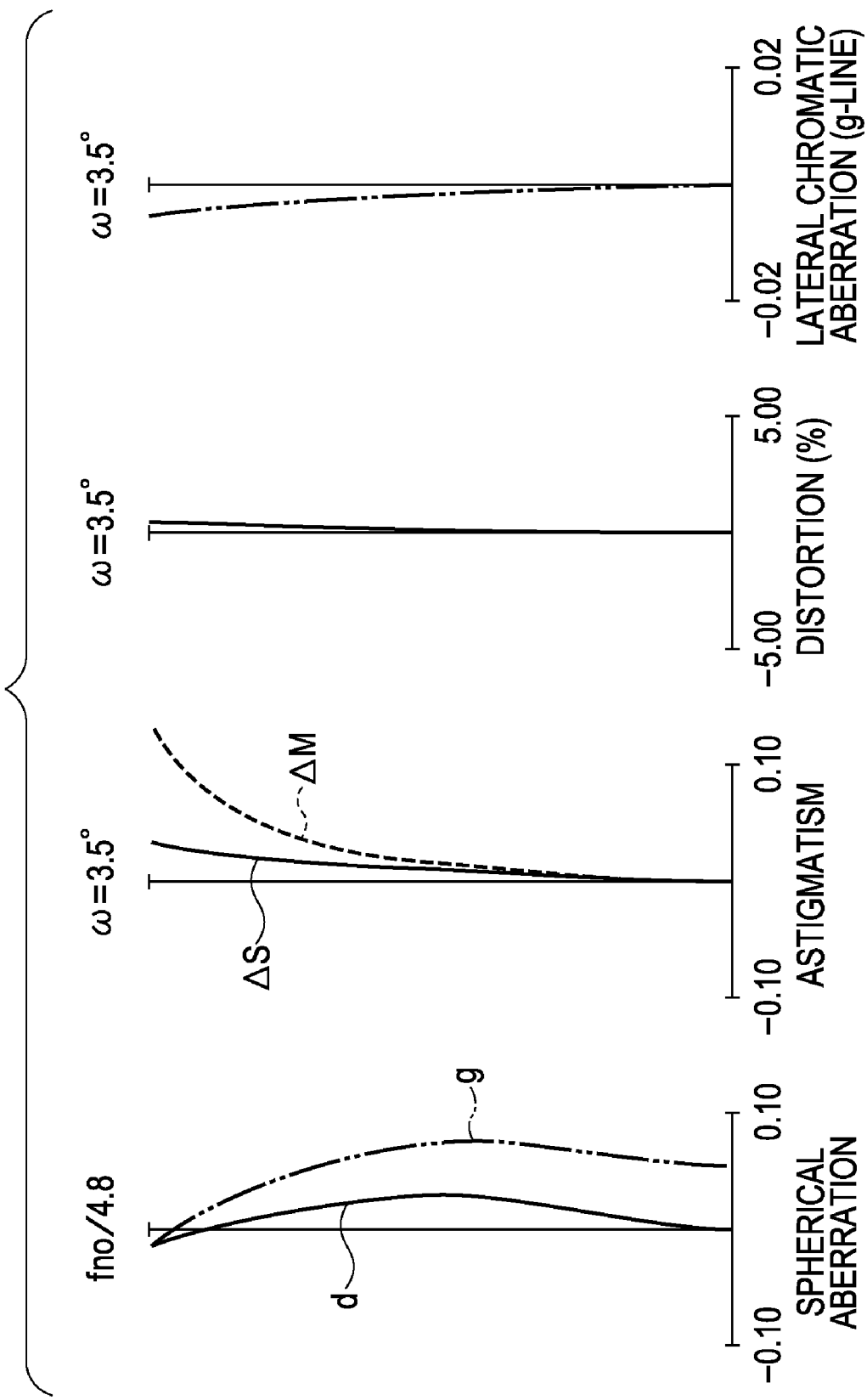
FIG. 6 is an aberration diagram at the telephoto end of the zoom lens according to numerical example 2 corresponding to the second exemplary embodiment.

FIG. 4 illustrates a lens cross section at the wide-angle end of the zoom lens according to the second exemplary embodiment of the present invention. FIG. 5 and FIG. 6 are aberration diagrams at the wide-angle end and telephoto end, respectively, of the zoom lens according to the second exemplary embodiment.

Figure 7:
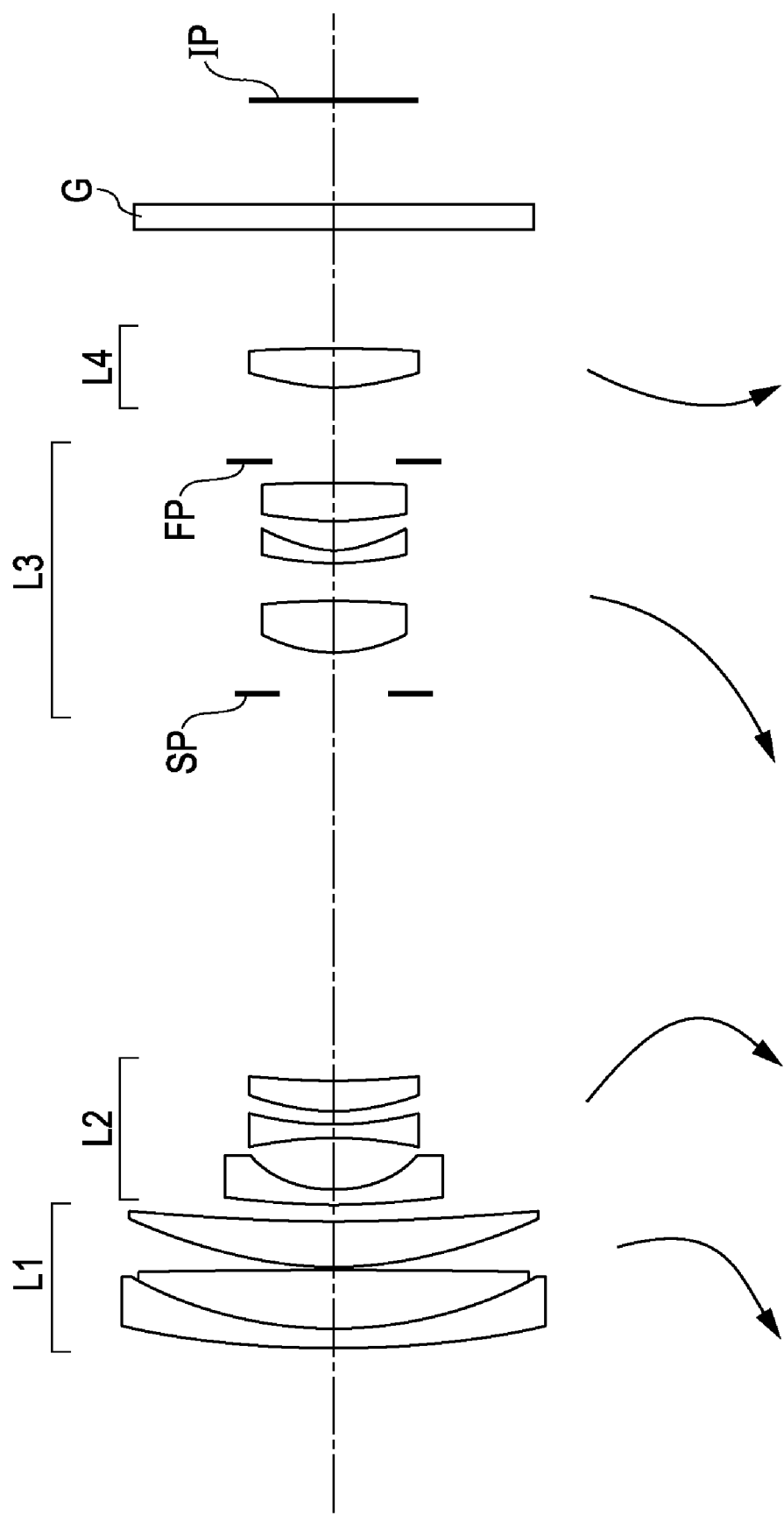
FIG. 7 illustrates a lens cross section at the wide-angle end of a zoom lens according to a third exemplary embodiment of the present invention.
Figure 8:
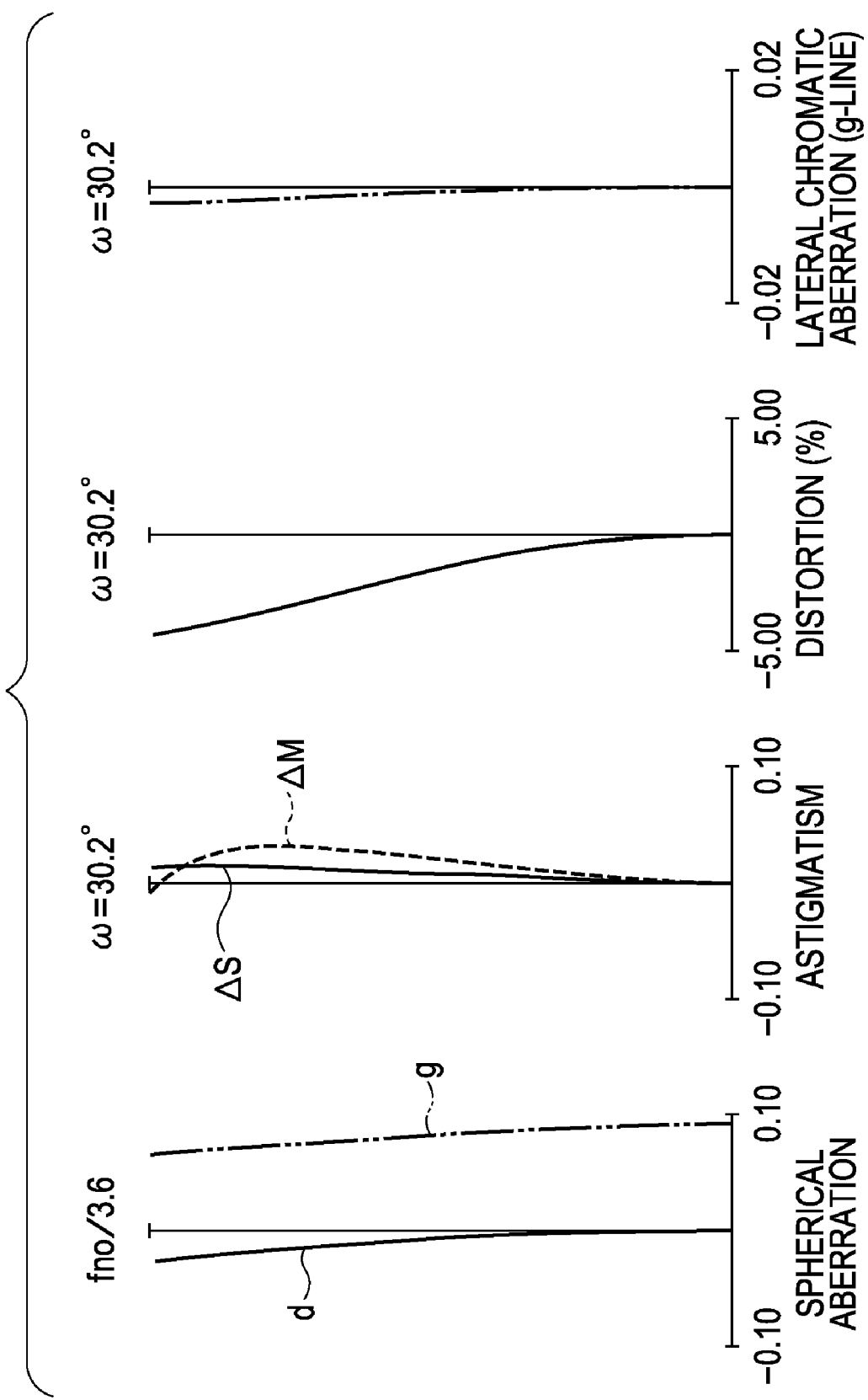
FIG. 8 is an aberration diagram at the wide-angle end of the zoom lens according to numerical example 3 corresponding to the third exemplary embodiment.
Figure 9:
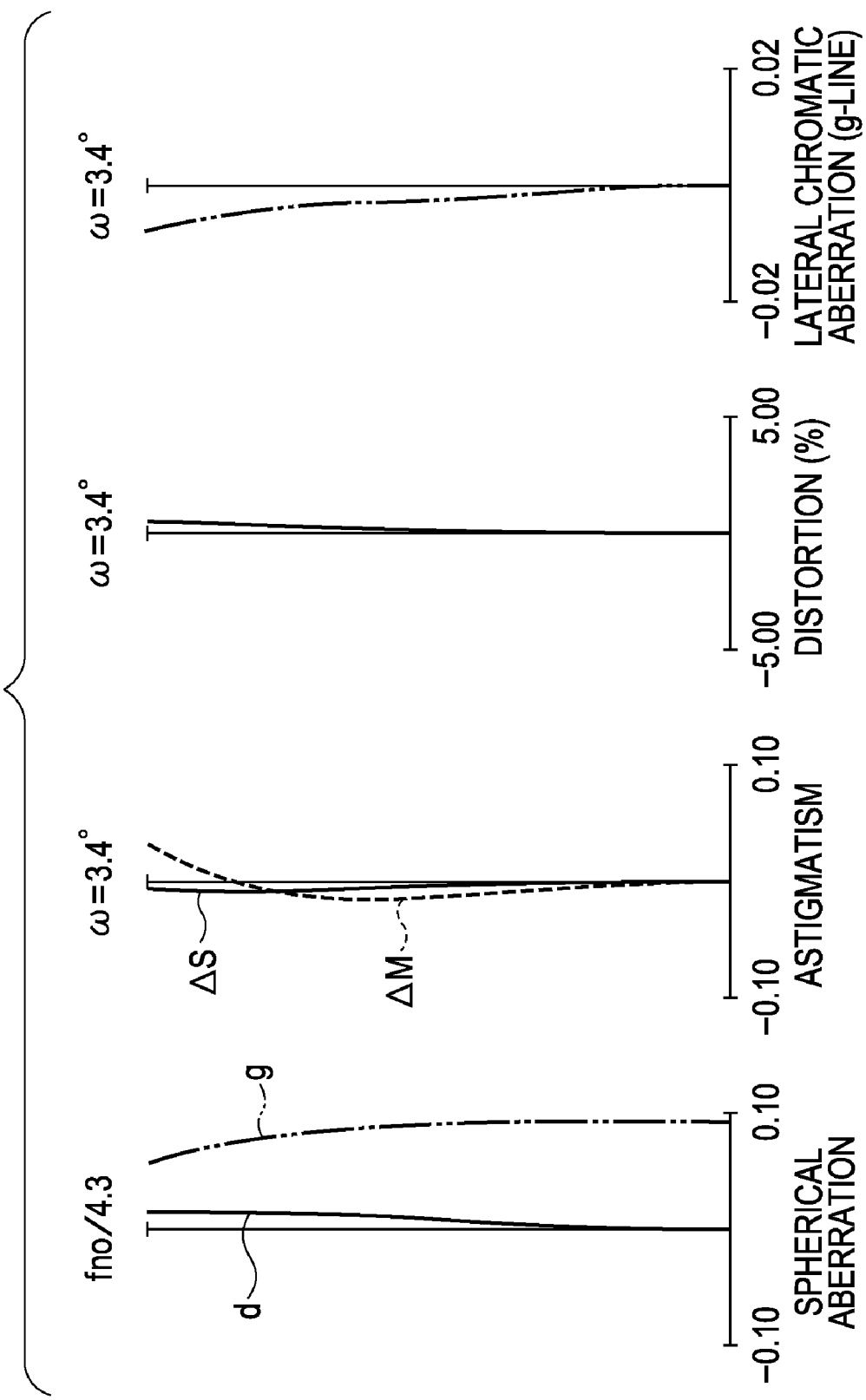
FIG. 9 is an aberration diagram at the telephoto end of the zoom lens according to numerical example 3 corresponding to the third exemplary embodiment.

FIG. 7 illustrates a lens cross section at the wide-angle end of the zoom lens according to the third exemplary embodiment of the present invention. FIG. 8 and FIG. 9 are aberration diagrams at the wide-angle end and telephoto end, respectively, of the zoom lens according to the third exemplary embodiment.

Figure 10:
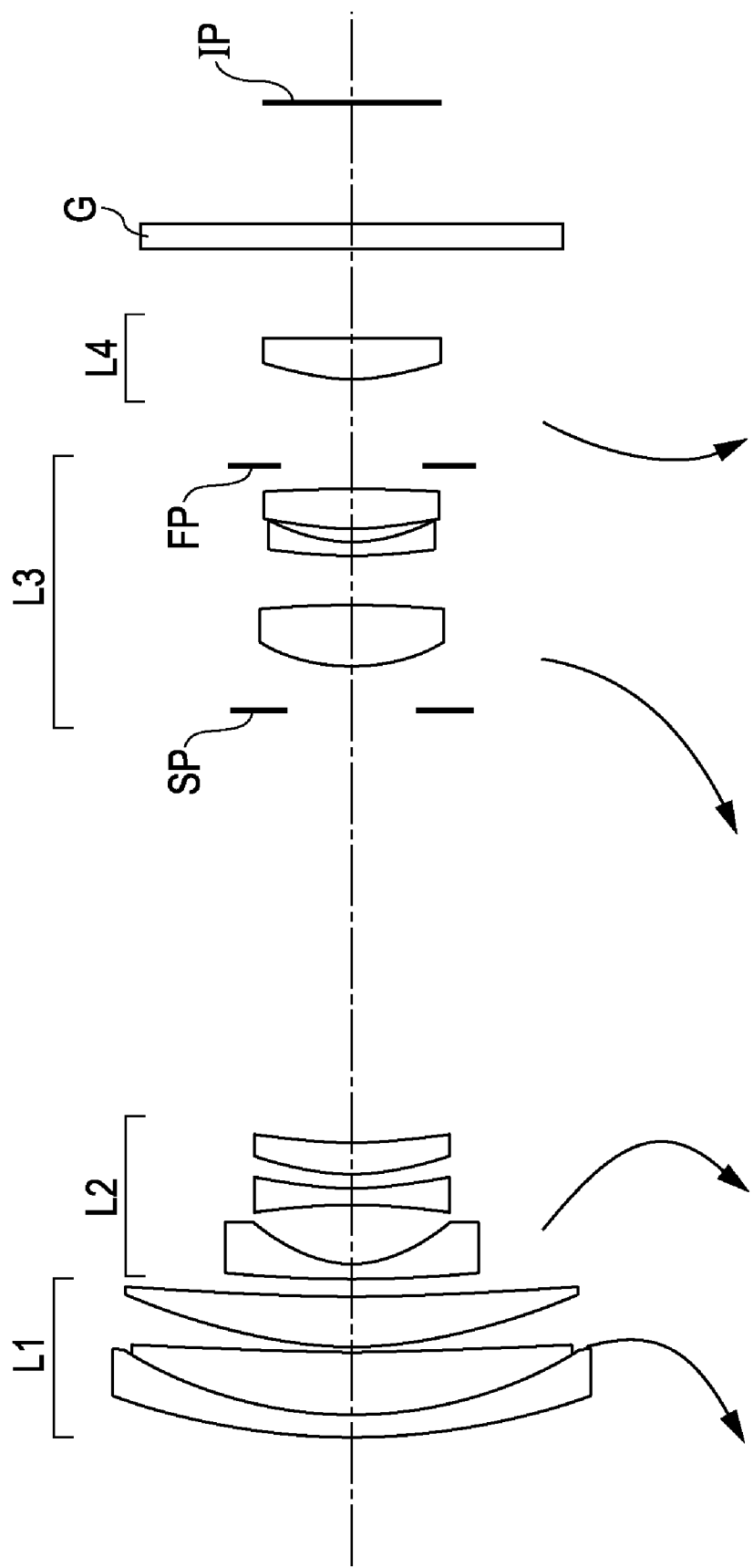
FIG. 10 illustrates a lens cross section at the wide-angle end of a zoom lens according to a fourth exemplary embodiment of the present invention.
Figure 11:
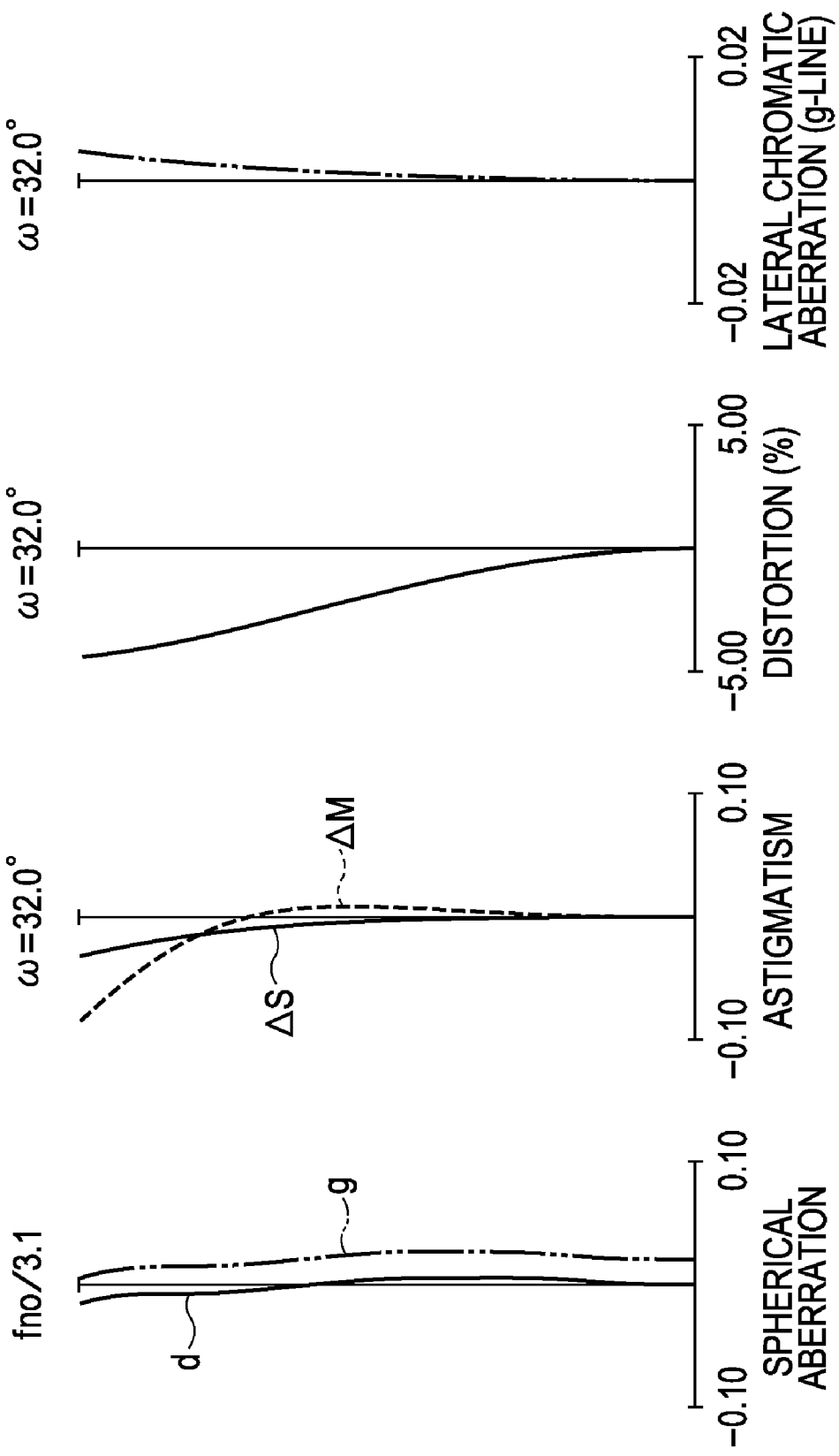
FIG. 11 is an aberration diagram at the wide-angle end of the zoom lens according to numerical example 4 corresponding to the fourth exemplary embodiment.
Figure 12:
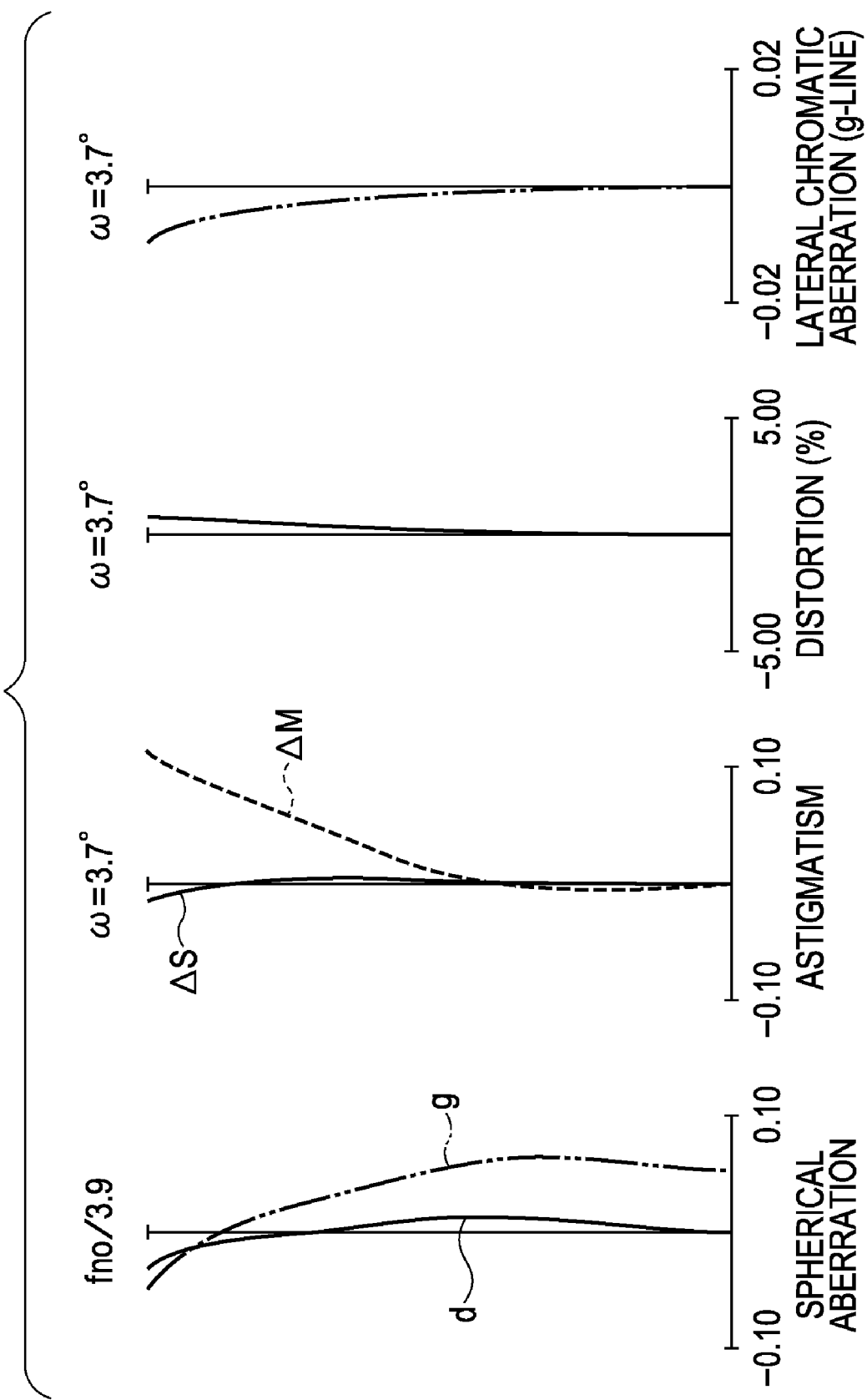
FIG. 12 is an aberration diagram at the telephoto end of the zoom lens according to numerical example 4 corresponding to the fourth exemplary embodiment.

FIG. 10 illustrates a lens cross section at the wide-angle end of the zoom lens according to the fourth exemplary embodiment of the present invention. FIG. 11 and FIG. 12 are aberration diagrams at the wide-angle end and telephoto end, respectively, of the zoom lens according to the fourth exemplary embodiment.

Figure 13:
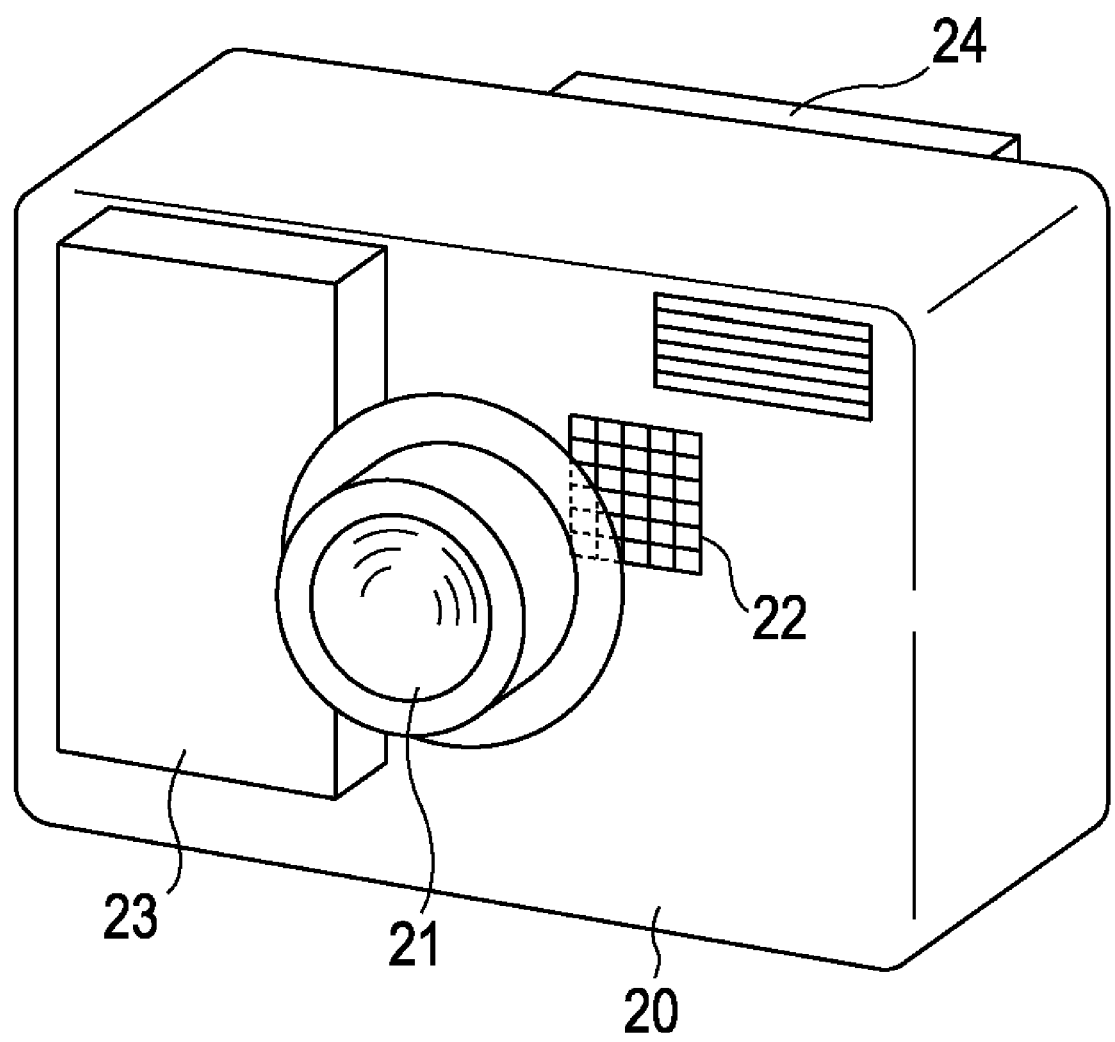
FIG. 13 is a schematic diagram of an image pickup apparatus according to at least one exemplary embodiment of the present invention.

FIG. 13 is a schematic diagram illustrating a main part of a camera (image pickup apparatus) including the zoom lens according to at least one exemplary embodiment of the present invention.

The zoom lens of each exemplary embodiment is a photographing lens system included in an image pickup apparatus, such as a video camcorder, a digital camera, or a silver-halide film camera.

In the cross-sectional views of FIG. 1, FIG. 4, FIG. 7, and FIG. 10, the object (front) side is on the left and the image (rear) side is on the right. In these cross-sectional views, Li denotes the i-th lens unit, where "i" denotes the order of a lens unit from the object side.

The cross-sectional views of FIG. 1, FIG. 4, FIG. 7, and FIG. 10 each illustrate a first lens unit L1 having positive refractive power (optical power=reciprocal of focal length), a second lens unit L2 having negative refractive power, a third lens unit L3 having positive refractive power, a fourth lens unit L4 having positive refractive power, an aperture stop SP, an optical block G, and an image plane IP. Additionally, the cross-sectional views of FIG. 4, FIG. 7, and FIG. 10 illustrate a flare stop FP.

The aperture stop SP is arranged on the object side of the third lens unit L3. The optical block G includes an optical filter, a faceplate, a crystal low-pass filter, an infrared cut filter, or the like. When the zoom lens is used as a photographing optical system for a video camcorder or a digital still camera, the image pickup surface of a solid-state image pickup device (photoelectric conversion element), such as a charge-coupled device (CCD) sensor or a complementary metal oxide semiconductor (CMOS) sensor, is located at the position of the image plane IP. When the zoom lens is used as a photographing optical system for a silver-halide film camera, a photosensitive surface corresponding to the film surface of the camera is located at the position of the image plane IP.

In the aberration diagrams of FIGS. 2, 3, 5, 6, 8, 9, 11, and 12, "d" and "g" denote a d-line and a g-line, respectively; ΔM and ΔS denote a meridional image plane and a sagittal image plane, respectively; ω denotes a half angle of view; and fno denotes an F-number. A lateral chromatic aberration is indicated by the g-line.

In each exemplary embodiment described below, wide-angle end and telephoto end refer to zoom positions where lens units (mainly the second lens unit L2 and the third lens unit L3) which contribute to changes in magnification are located at both ends of a mechanically movable range along the optical axis.

In each exemplary embodiment, during zooming from the wide-angle end to the telephoto end, the lens units are moved as indicated by arrows.

Specifically, during zooming from the wide-angle end to the telephoto end, the first lens unit L1 is moved along a locus convex toward the image side, the second lens unit L2 is moved toward the image side, the third lens unit L3 is moved toward the object side, and the fourth lens unit L4 is moved along a locus convex toward the object side.

During zooming, the first lens unit L1 and the third lens unit L3 are moved to be positioned closer to the object at the telephoto end than at the wide-angle end. This makes it possible to achieve a high zoom ratio while maintaining compactness of the overall lens length at the wide-angle end.

In particular, in each exemplary embodiment, by moving the third lens unit L3 to the object side during zooming from the wide-angle end to the telephoto end, it is made possible that the third lens unit L3 has a magnification-varying effect.

Additionally, the first lens unit L1 having positive refractive power is moved to be positioned closer to the object at the telephoto end than at the wide-angle end. This allows the second lens unit L2 to have a large magnification-varying effect and makes it possible to achieve a high zoom ratio of about 10 times without having to significantly increase the refractive power of the first lens unit L1 and second lens unit L2.

At the same time, a rear-focusing method in which the fourth lens unit L4 is moved along the optical axis for focusing is used.

To perform focusing from an object at infinity to an object at a close distance at the telephoto end, the fourth lens unit L4 is moved forward as indicated by arrow 4c of FIG. 1. When an object at infinity or an object at a close distance is in focus, the fourth lens unit L4 is moved along a locus indicated by solid curve 4a or dotted curve 4b, respectively, for correcting image plane variations during zooming from the wide-angle end to the telephoto end.

In each exemplary embodiment, quick focusing is achieved by moving the fourth lens unit L4, which is lightweight. For example, moving the lightweight fourth lens unit L4 for focusing facilitates the operation of autofocus detection.

In each exemplary embodiment, by moving the third lens unit L3 such that it has a component in a direction perpendicular to the optical axis, an image is displaced in a direction perpendicular to the optical axis. This makes it possible to correct image blur caused by vibration of the entire optical system. In other words, since image stabilization is achieved without requiring any additional optical member (such as a variable apical angle prism) or lens unit for image stabilization, it is possible to prevent the entire optical system from increasing in size.

Although, in each exemplary embodiment, the aperture stop SP is moved together with the third lens unit L3 during zooming, the aperture stop SP may be moved independently of the third lens unit L3 or may be fixed. However, if the aperture stop SP and the third lens unit L3 are moved together, it is easier to simplify the mechanical structure of the zoom lens, since the number of component groups formed according to the mode of movement can be reduced.

On the other hand, moving the aperture stop SP independently of the third lens unit L3 is advantageous in that the front lens diameter can be reduced.

If the aperture stop SP is fixed, there is no need to move an aperture unit. This is advantageous in terms of power saving, since the drive torque of an actuator driven for zooming can be set to a small value.

The effective lens diameter of the first lens unit L1 is large. Therefore, for weight reduction, the number of lens elements included in the first lens unit L1 should be small.

For aberration correction, the first lens unit L1 includes, in order from the object side to the image side, a negative lens element and a positive lens element.

In each exemplary embodiment, the first lens unit L1 includes a cemented lens component formed by cementing a positive lens element and a negative lens element together and a positive lens element. This is to reduce spherical and chromatic aberrations caused by an increase in zoom ratio.

The second lens unit L2 includes three independent lens elements, that is, a negative meniscus lens element having a convex surface on the object side, a negative lens element having concave surfaces on both sides, and a positive lens element having a convex surface on the object side.

This makes it possible to reduce aberration variations during zooming and, in particular, effectively correct distortion aberration at the wide-angle end and spherical aberration at the telephoto end.

For aberration correction, the third lens unit L3 includes two positive lens elements and one negative lens element.

For example, the third lens unit L3 includes, in order from the object side to the image side, a positive lens element, a negative lens element, and a positive lens element.

Alternatively, the third lens unit L3 includes, in order from the object side to the image side, a positive lens element, a positive lens element, and a negative lens element.

In particular, in the second exemplary embodiment, the third lens unit L3 includes, in order from the object side to the image side, two positive lens elements and one negative lens element having a concave surface on the image side. This reduces the distance between principal points of the second lens unit L2 and third lens unit L3, and thus reduces the overall lens length of the third lens unit L3 and other components downstream thereof.

The third lens unit L3 includes at least one aspheric surface. This makes it possible to effectively correct aberration variations during zooming.

The fourth lens unit L4 is constituted by a single positive lens element. More specifically, the fourth lens unit L4 is constituted by a single positive lens element having a convex surface on the object side.

With the configuration described above, a compact zoom lens with a high zoom ratio is achieved in each exemplary embodiment.

To achieve better optical performance while reducing the size of the entire zoom lens of each exemplary embodiment, at least one of the following conditions should be satisfied. If a condition is satisfied, effects corresponding to the condition can be obtained.

At least one of the following conditions is satisfied:

$$0.3 < |m1/m2| < 1.5 \quad (1)$$

$$0.3 < |m3/m2| < 0.8 \quad (2)$$

$$0.5 < \beta 2z/(ft/fw) < 1.0 \quad (3)$$

$$0.2 < f3/ft < 0.4 \quad (4)$$

where m1, m2, and m3 are the amounts of movement of the first lens unit L1, second lens unit L2, and third lens unit L3, respectively, along the optical axis during zooming from the wide-angle end to the telephoto end; β2z is the ratio of imaging magnification of the second lens unit L2 at the telephoto end to that at the wide-angle end; fw and ft are the focal lengths of the zoom lens at the wide-angle end and telephoto end, respectively; and f3 is the focal length of the third lens unit L3.

Here, the amount of movement is defined as a difference between the position of each lens unit along the optical axis with respect to the image plane at the wide-angle end and that at the telephoto end.

In each exemplary embodiment, by satisfying each condition, effects corresponding to the condition are obtained.

The technical meanings of the foregoing conditions will now be described.

Conditions (1) and (2) define the appropriate amounts of movement of the first lens unit L1, second lens unit L2, and third lens unit L3, which contribute to changes in magnification, during zooming from the wide-angle end to the telephoto end.

If the lower limit of condition (1) is not reached and the amount of movement m1 of the first lens unit L1 during zooming becomes small, the height of an off-axis light beam passing through a lens surface on the object side increases in the vicinity of the wide-angle end at which the effective diameter of the front lens is determined. This causes an increase in lens effective diameter and thus is not preferable.

On the other hand, if the upper limit of condition (1) is exceeded and the amount of movement m2 of the second lens unit L2, which is a main magnification-varying lens unit, becomes small, it is necessary to increase the refractive power of the second lens unit L2 to achieve a desired zoom ratio. As a result, it becomes difficult to effectively correct coma aberration and curvature of field throughout the entire zoom range.

If the lower limit of condition (2) is not reached and the amount of movement m2 of the second lens unit L2 becomes large, the overall length of the lens barrel increases while a sufficient zoom ratio can be achieved. Alternatively, if the amount of movement m3 of the third lens unit L3 becomes small, it is difficult to divide the magnification-varying operation between the second lens unit L2 and the third lens unit L3. Therefore, to achieve the same zoom ratio, it is necessary to increase the refractive power of the second lens unit L2. As a result, it becomes difficult to effectively correct aberrations throughout the entire zoom range or to reduce sensitivity. Here, the term "sensitivity" refers to the ratio of the amount of change in optical performance to the amounts of displacement of lens units or lens elements.

On the other hand, if the upper limit of condition (2) is exceeded and the amount of movement m3 of the third lens unit L3 becomes too large, since the distance of the entrance pupil from the lens element closest to the object becomes large at the wide-angle end, the front lens diameter increases.

Condition (3) defines the appropriate proportion of magnification-varying operation assigned to the second lens unit L2. If the lower limit of condition (3) is not reached and the proportion of magnification-varying operation to be performed by the second lens unit L2, which is a main magnification-varying lens unit, becomes too small, the amount of movement necessary for the other lens units to achieve a high zoom ratio (of about 10 times) becomes extremely large, which increases the overall lens length.

On the other hand, if the upper limit of condition (3) is exceeded, a Petzval sum in the entire lens system increases in a negative direction. This makes it difficult to correct curvature of field and astigmatic difference.

Condition (4) defines the appropriate focal length of the third lens unit L3. If the lower limit of condition (4) is not reached and the refractive power of the third lens unit L3 becomes too large, it becomes difficult to effectively correct aberrations throughout the entire zoom range and, at the same time, aberration variations that occur when the third lens unit L3 is moved such that it has a component in a direction perpendicular to the optical axis for image blur correction (or image stabilization) increase. On the other hand, if the upper limit of condition (4) is exceeded, it is necessary to increase the refractive power of the second lens unit L2 and the fourth lens unit L4 to achieve a high zoom ratio. As a result, it becomes difficult to effectively correct coma aberration and astigmatic difference particularly at the telephoto end.

In the exemplary embodiments described above, to further reduce the size of the entire lens system while more effectively performing aberration correction and reducing aberration variations during zooming, the numerical ranges defined by conditions (1) to (4) can be modified as follows:

$$0.4 < |m1/m2| < 1.2 \quad (1a)$$

$$0.4 < |m3/m2| < 0.7 \quad (2a)$$

$$0.6 < \beta 2z/(ft/fw) < 0.9 \quad (3a)$$

$$0.24 < f3/ft < 0.35 \quad (4a)$$

By appropriately defining the amount of movement of each lens unit during zooming, the refractive power of each lens unit, and the like as described above, it becomes easy to reduce the size of the entire lens system while a higher zoom ratio can be achieved. At the same time, it becomes easy to achieve good optical performance throughout the entire zoom range from the wide-angle end to the telephoto end.

Next, numerical examples 1 through 4 corresponding to the first through fourth exemplary embodiments, respectively, of the present invention will be described. In each numerical example, "i" denotes the order of an optical surface from the object side, ri denotes the curvature radius of the i-th optical surface (i-th surface), di denotes the distance between the i-th surface and the (i+1)-th surface, and ni and vi denote the refractive index and Abbe number, respectively, of the material of the i-th optical member with respect to the d-line.

An aspheric shape is expressed as follows:

$$x = (h^2/R)/[1 + [1-(1+k)(h/R)^2]^{1/2}] + Bh^4 + Ch^6 + Dh^8 + Eh^{10} + A'h^3 + B'h + C'h^7$$

where, with respect to a surface vertex, "x" is the amount of displacement in the direction of the optical axis at a height "h" from the optical axis; R is a curvature radius; "k" is eccentricity; and B, C, D, E, A', B', and C' are aspheric coefficients. Additionally, for example, "E-Z" means "10-Z", "f" denotes a focal length, Fno denotes an F-number, and ω denotes a half angle of view.

In each numerical example, the last two surfaces are surfaces of a filter, a faceplate, or the like included in the optical block.

The relationship of the above-described conditions and the numerical examples will be shown in Table 1.

| Numerical Example 1 | | | |
|---|---|---|---|
| f = 6.30-60.78 Fno = 3.3-4.2 2ω = 61.4°-7.0° | | | |
| r1 = 24.785 | d1 = 1.20 | n1 = 1.84666 | v1 = 23.9 |
| r2 = 18.039 | d2 = 3.80 | n2 = 1.48749 | v2 = 70.2 |
| r3 = 175.377 | d3 = 0.20 | | |
| r4 = 30.374 | d4 = 2.00 | n3 = 1.69680 | v3 = 55.5 |
| r5 = 80.046 | d5 = Variable | | |
| r6 = 39.789 | d6 = 0.80 | n4 = 1.83481 | v4 = 42.7 |
| r7 = 6.515 | d7 = 3.28 | | |
| r8 = −21.103 | d8 = 0.70 | n5 = 1.60311 | v5 = 60.6 |
| r9 = 21.798 | d9 = 0.50 | | |
| r10 = 12.954 | d10 = 1.60 | n6 = 1.92286 | v6 = 16.9 |
| r11 = 34.135 | d11 = Variable | | |
| r12 = (Stop) | d12 = 2.00 | | |
| r13 = 8.356 | d13 = 3.00 | n7 = 1.58313 | v7 = 59.4 |
| r14 = −66.525 | d14 = 1.70 | | |
| r15 = 20.533 | d15 = 0.70 | n8 = 1.84666 | v8 = 23.9 |
| r16 = 7.833 | d16 = 0.70 | | |
| r17 = 25.909 | d17 = 2.00 | n9 = 1.48749 | v9 = 70.2 |
| r18 = −30.666 | d18 = Variable | | |
| r19 = 15.542 | d19 = 2.00 | n10 = 1.48749 | v10 = 70.2 |
| r20 = −220.973 | d20 = 6.00 | | |

-continued

Numerical Example 1

| | | | |
|---|---|---|---|
| r21 = ∞ | d21 = 1.50 | n11 = 1.49831 | ν11 = 65.1 |
| r22 = ∞ | | | |

| Variable | Focal Length | | |
|---|---|---|---|
| Distance | 6.30 | 19.57 | 60.78 |
| d5 | 0.80 | 11.26 | 21.82 |
| d11 | 23.13 | 7.75 | 1.61 |
| d18 | 4.00 | 5.43 | 13.90 |

Aspheric Surface
(The 13th Surface)

| | | | |
|---|---|---|---|
| k = −1.25544 | | | |
| B = 1.72457E−4 | C = 4.42014E−5 | D = 5.07841E−7 | E = 5.40685E−9 |
| A' = −2.90504E−5 | B' = −9.93962E−5 | C' = −8.63841E−6 | |

Numerical Example 2 f = 6.45-60.89 Fno = 3.6-4.8 2ω = 60.0°-7.0°

| | | | |
|---|---|---|---|
| r1 = 42.276 | d1 = 1.00 | n1 = 1.80518 | ν1 = 25.4 |
| r2 = 22.053 | d2 = 2.90 | n2 = 1.48749 | ν2 = 70.2 |
| r3 = 113.831 | d3 = 0.20 | | |
| r4 = 26.577 | d4 = 2.30 | n3 = 1.80400 | ν3 = 46.6 |
| r5 = 126.095 | d5 = Variable | | |
| r6 = 39.114 | d6 = 0.80 | n4 = 1.83481 | ν4 = 42.7 |
| r7 = 6.650 | d7 = 2.78 | | |
| r8 = −21.494 | d8 = 0.70 | n5 = 1.60311 | ν5 = 60.6 |
| r9 = 30.867 | d9 = 0.70 | | |
| r10 = 13.140 | d10 = 1.60 | n6 = 1.92286 | ν6 = 18.9 |
| r11 = 29.765 | d11 = Variable | | |
| r12 = (Stop) | d12 = 1.80 | | |
| r13 = 7.258 | d13 = 2.80 | n7 = 1.58313 | ν7 = 59.4 |
| r14 = −19.323 | d14 = 0.50 | | |
| r15 = 6.975 | d15 = 2.20 | n8 = 1.48749 | ν8 = 70.2 |
| r16 = −20.175 | d16 = 0.60 | n9 = 1.80610 | ν9 = 33.3 |
| r17 = 4.716 | d17 = Variable | | |
| r18 = 12.126 | d18 = 2.60 | n10 = 1.48749 | ν10 = 70.2 |
| r19 = −31.971 | d19 = 4.40 | | |
| r20 = ∞ | d20 = 1.30 | n11 = 1.49831 | ν11 = 65.1 |
| r21 = ∞ | | | |

| Variable | Focal Length | | |
|---|---|---|---|
| Distance | 6.45 | 19.84 | 60.89 |
| d5 | 0.70 | 12.68 | 24.79 |
| d11 | 20.48 | 6.33 | 1.71 |
| d17 | 5.00 | 5.54 | 13.82 |

Aspheric Surface
(The 13th Surface)

| | | | |
|---|---|---|---|
| k = −1.31284 | | | |
| B = 2.41099E−4 | C = 4.05529E−5 | D = 5.01069E−7 | E = 4.30044E−8 |
| A' = −1.17580E−4 | B' = −9.93962E−5 | C' = −8.49513E−6 | |

Numerical Example 3 f = 6.45-61.99 Fno = 3.6-4.3 2ω = 60.4°-6.8°

| | | | |
|---|---|---|---|
| r1 = 51.086 | d1 = 1.10 | n1 = 1.80518 | ν1 = 25.4 |
| r2 = 22.607 | d2 = 3.10 | n2 = 1.48749 | ν2 = 70.2 |
| r3 = −533.288 | d3 = 0.20 | | |

-continued

Numerical Example 3

| | | | |
|---|---|---|---|
| r4 = 23.554 | d4 = 2.40 | n3 = 1.80400 | ν3 = 46.6 |
| r5 = 104.832 | d5 = Variable | | |
| r6 = 45.887 | d6 = 0.80 | n4 = 1.83481 | ν4 = 42.7 |
| r7 = 6.324 | d7 = 2.81 | | |
| r8 = −19.769 | d8 = 0.70 | n5 = 1.60311 | ν5 = 60.6 |
| r9 = 18.764 | d9 = 0.70 | | |
| r10 = 12.768 | d10 = 1.60 | n6 = 1.92286 | ν6 = 18.9 |
| r11 = 37.899 | d11 = Variable | | |
| r12 = (Stop) | d12 = 2.20 | | |
| r13 = 7.723 | d13 = 2.70 | n7 = 1.58313 | ν7 = 59.4 |
| r14 = −42.991 | d14 = 2.00 | | |
| r15 = 21.929 | d15 = 0.70 | n8 = 1.84666 | ν8 = 23.9 |
| r16 = 6.925 | d16 = 1.50 | | |
| r17 = 22.378 | d17 = 2.00 | n9 = 1.48749 | ν9 = 70.2 |
| r18 = −51.334 | d18 = Variable | | |
| r19 = 14.386 | d19 = 2.00 | n10 = 1.48749 | ν10 = 70.2 |
| r20 = −62.203 | d20 = 6.40 | | |
| r21 = ∞ | d21 = 1.30 | n11 = 1.49831 | ν11 = 65.1 |
| r22 = ∞ | | | |

| Variable | Focal Length | | |
|---|---|---|---|
| Distance | 6.45 | 20.02 | 61.99 |
| d5 | 0.80 | 12.21 | 20.82 |
| d11 | 20.60 | 7.24 | 1.89 |
| d18 | 5.16 | 4.18 | 13.82 |

Aspheric Surface
(The 13th Surface)

| | | | |
|---|---|---|---|
| k = −1.28514 | | | |
| B = 2.14292E−4 | C = 4.20101E−5 | D = 5.55557E−7 | E = 4.32089E−9 |
| A' = 5.39535E−5 | B' = −9.93962E−5 | C' = −8.39069E−6 | |

Numerical Example 4 f = 6.0-57.72 Fno = 3.1-3.9 2ω = 64.0°-7.4°

| | | | |
|---|---|---|---|
| r1 = 33.008 | d1 = 1.00 | n1 = 1.80518 | ν1 = 25.4 |
| r2 = 19.796 | d2 = 3.00 | n2 = 1.48749 | ν2 = 70.2 |
| r3 = 161.798 | d3 = 0.20 | | |
| r4 = 23.425 | d4 = 2.30 | n3 = 1.69680 | ν3 = 55.5 |
| r5 = 118.127 | d5 = Variable | | |
| r6 = 43.672 | d6 = 0.75 | n4 = 1.83481 | ν4 = 42.7 |
| r7 = 6.155 | d7 = 2.80 | | |
| r8 = −21.862 | d8 = 0.65 | n5 = 1.60311 | ν5 = 60.6 |
| r9 = 17.118 | d9 = 0.65 | | |
| r10 = 11.769 | d10 = 1.50 | n6 = 1.92286 | ν6 = 18.9 |
| r11 = 30.592 | d11 = Variable | | |
| r12 = (Stop) | d12 = 2.05 | | |
| r13 = 7.910 | d13 = 2.80 | n7 = 1.58313 | ν7 = 59.4 |
| r14 = −43.314 | d14 = 2.23 | | |
| r15 = 20.575 | d15 = 0.65 | n8 = 1.84666 | ν8 = 23.9 |
| r16 = 7.028 | d16 = 0.65 | | |
| r17 = 16.762 | d17 = 1.80 | n9 = 1.48749 | ν9 = 70.2 |
| r18 = −48.368 | d18 = Variable | | |
| r19 = 12.730 | d19 = 1.90 | n10 = 1.48749 | ν10 = 70.2 |
| r20 = −161.273 | d20 = 4.09 | | |

-continued

Numerical Example 4

| r21 = ∞ | d21 = 1.21 | n11 = 1.49831 | ν11 = 65.1 |
| r22 = ∞ | | | |

| Variable | Focal Length | | |
| --- | --- | --- | --- |
| Distance | 6.00 | 18.59 | 57.72 |
| d5 | 0.74 | 11.64 | 20.30 |
| d11 | 19.99 | 6.93 | 1.72 |
| d18 | 5.16 | 5.30 | 13.94 |

Aspheric Surface
(The 13th Surface)

| k = −7.15313E−1 | | | |
| --- | --- | --- | --- |
| B = 7.93011E−5 | C = 6.17939E−5 | D = 9.16402E−7 | E = 1.04383E−8 |
| A' = −8.18523E−5 | B' = −1.32741E−4 | C' = −1.33676E−5 | |

TABLE 1

| Conditions | | Numerical Example 1 | Numerical Example 2 | Numerical Example 3 | Numerical Example 4 |
| --- | --- | --- | --- | --- | --- |
| (1) | m1/m2 | −0.62 | −0.99 | −0.54 | −0.62 |
| (2) | m3/m2 | −0.65 | −0.55 | −0.44 | −0.51 |
| (3) | β2z/(ft/fw) | 0.66 | 0.69 | 0.86 | 0.75 |
| (4) | f3/ft | 0.30 | 0.25 | 0.31 | 0.29 |

Next, an exemplary digital still camera which includes a zoom lens of at least one exemplary embodiment of the present invention as a photographing optical system will be described with reference to FIG. 13.

Referring to FIG. 13, the digital still camera includes a camera body 20, a photographing optical system 21, a solid-state image pickup device (photoelectric conversion element) 22, a memory 23, and a finder 24. The photographing optical system 21 is a zoom lens according to at least one of the first through fourth exemplary embodiments of the present invention. The solid-state image pickup device 22, such as a CCD sensor or a CMOS sensor, is included in the camera body 20, detects a subject image formed by the photographing optical system 21, and photoelectrically converts the detected subject image into information, which is recorded in the memory 23. The finder 24, such as a liquid crystal display panel, allows observation of the subject image formed on the solid-state image pickup device 22.

Thus, by applying a zoom lens of at least one exemplary embodiment of the present invention to an image pickup apparatus, such as a digital still camera, a compact image pickup apparatus having high optical performance can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-019133 filed Jan. 30, 2007, which is hereby incorporated by reference herein in its entirety.

What is claimed is:

1. A zoom lens comprising, in order from an object side to an image side:
   a first lens unit having positive refractive power;
   a second lens unit having negative refractive power;
   a third lens unit having positive refractive power;
   a fourth lens unit having positive refractive power,
   wherein the zoom lens performs zooming by moving each of the lens units;
   the first lens unit and the third lens unit are positioned closer to the object at a telephoto end than at a wide-angle end; and
   the zoom lens satisfies the following conditions:

$0.3 < |m1/m2| < 1.5$ $0.3 < |m3/m2| < 0.8$ where m1, m2, and m3 are the amounts of movement of the first lens unit, the second lens unit, and the third lens unit, respectively, along an optical axis during zooming from the wide-angle end to the telephoto end,
   wherein the third lens unit includes, in order from the object side to the image side, a positive lens element, a positive lens element, and a negative lens element.

2. The zoom lens according to claim 1, wherein the third lens unit includes two positive lens elements and one negative lens element.

3. The zoom lens according to claim 1, wherein the zoom lens satisfies the following condition:

$0.5 < \beta 2z/(ft/fw) < 1.0$ where β2z is a ratio of imaging magnification of the second lens unit at the telephoto end to imaging magnification of the second lens unit at the wide-angle end, and fw and ft are focal lengths of the zoom lens at the wide-angle end and the telephoto end, respectively.

4. The zoom lens according to claim 1, wherein during zooming from the wide-angle end to the telephoto end, the fourth lens unit moves along a locus convex toward the object side.

5. The zoom lens according to claim 1, wherein the first lens unit includes, in order from the object side to the image side, a negative lens element and a positive lens element.

6. The zoom lens according to claim 1, wherein the zoom lens satisfies the following condition:

$0.2 < f3/ft < 0.4$ where f3 is a focal length of the third lens unit and ft is a focal length of the zoom lens at the telephoto end.

7. The zoom lens according to claim 1, wherein the fourth lens unit is constituted by a single positive lens element.

8. The zoom lens according to claim 1, wherein an image is displaced in a direction perpendicular to the optical axis by moving the third lens unit such that the third lens unit has a component in a direction perpendicular to the optical axis.

9. The zoom lens according to claim 1, wherein the zoom lens forms an image on a solid-state image pickup device.

10. An image pickup apparatus comprising:
    the zoom lens according to claim 1; and
    a solid-state image pickup device configured to detect an image formed by the zoom lens.

* * * * *